(12) United States Patent
Shimomura et al.

(10) Patent No.: US 10,243,420 B2
(45) Date of Patent: Mar. 26, 2019

(54) EMBEDDED MAGNET ROTOR FOR ROTARY ELECTRIC MACHINE HAVING GAPS WITH ADHESIVE FILL RATES

(71) Applicant: Mitsubishi Electric Corporation, Tokyo (JP)

(72) Inventors: Ryuichi Shimomura, Tokyo (JP); Masaya Inoue, Tokyo (JP); Yutaka Ikura, Tokyo (JP); Yoshinobu Sugimoto, Tokyo (JP); Shinji Sano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 634 days.

(21) Appl. No.: 14/782,439

(22) PCT Filed: May 13, 2013

(86) PCT No.: PCT/JP2013/063275
§ 371 (c)(1),
(2) Date: Oct. 5, 2015

(87) PCT Pub. No.: WO2014/184842
PCT Pub. Date: Nov. 20, 2014

(65) Prior Publication Data
US 2016/0049836 A1    Feb. 18, 2016

(51) Int. Cl.
*H02K 1/27* (2006.01)
*H02K 1/28* (2006.01)
(Continued)

(52) U.S. Cl.
CPC .............. *H02K 1/28* (2013.01); *H02K 1/276* (2013.01); *H02K 1/27* (2013.01); *H02K 3/28* (2013.01);
(Continued)

(58) Field of Classification Search
CPC ............ H02K 1/16; H02K 1/165; H02K 1/27; H02K 1/276; H02K 1/28; H02K 3/28; H02K 3/34; H02K 3/345; H02K 15/12
(Continued)

(56) References Cited

U.S. PATENT DOCUMENTS

| 5,157,297 A * | 10/1992 | Uchida | H02K 1/2773 |
|  |  |  | 310/156.61 |
| 2009/0026867 A1* | 1/2009 | Haruno | H02K 1/2766 |
|  |  |  | 310/156.21 |
| 2011/0258840 A1* | 10/2011 | Urano | H02K 1/148 |
|  |  |  | 29/596 |

(Continued)

FOREIGN PATENT DOCUMENTS

| JP | 2005-269804 A | 9/2005 |
| JP | 2008-199831 A | 8/2008 |

(Continued)

OTHER PUBLICATIONS

International Search Report for PCT/JP2013/063275 dated Jul. 2, 2013 English Translation.

(Continued)

*Primary Examiner* — Bernard Rojas
*Assistant Examiner* — Rashad H Johnson
(74) *Attorney, Agent, or Firm* — Sughrue Mion, PLLC; Richard C. Turner

(57) ABSTRACT

In an embedded magnet rotor for a rotary electric machine, permanent magnets are respectively accommodated in magnet housing apertures that pass axially through a rotor core that is held by a shaft, an adhesive is injected into and cured in gaps between the permanent magnets and the rotor core in the magnet housing apertures, and fixes the permanent magnets to the rotor core, a first end plate is held by the shaft so as to contact a first axial end of the rotor core, and blocks first axial end openings of the plurality of magnet housing (Continued)

apertures, and a fill rate of the adhesive that is injected into the gaps is increased gradually from a first axial end toward a second axial end of the magnet housing apertures.

3 Claims, 4 Drawing Sheets

(51) Int. Cl.
    *H02K 3/34*     (2006.01)
    *H02K 3/28*     (2006.01)
    *H02K 15/12*     (2006.01)

(52) U.S. Cl.
    CPC ............... *H02K 3/34* (2013.01); *H02K 3/345* (2013.01); *H02K 15/12* (2013.01)

(58) Field of Classification Search
    USPC .................. 310/154.07, 156.21, 215; 29/596
    See application file for complete search history.

(56) References Cited

U.S. PATENT DOCUMENTS

| 2012/0139377 | A1  | 6/2012 | Kim |
| 2014/0077652 | A1* | 3/2014 | Yamagishi ........... H02K 1/2766 310/156.21 |
| 2017/0012510 | A1* | 1/2017 | Hattori .................... H02K 1/04 |

FOREIGN PATENT DOCUMENTS

| JP | 4556556 B2 | 10/2010 |
| JP | 2011-62076 A | 3/2011 |
| JP | 2012-120422 A | 6/2012 |

OTHER PUBLICATIONS

Communication dated May 24, 2016 from Japanese Patent Office in counterpart Application No. 2015-516767.

* cited by examiner

EMBEDDED MAGNET ROTOR FOR ROTARY ELECTRIC MACHINE HAVING GAPS WITH ADHESIVE FILL RATES

CROSS REFERENCE TO RELATED APPLICATIONS

This application is a National Stage of International Application No. PCT/JP2013/063275 filed May 13, 2013, the contents of which are incorporated herein by reference in their entirety.

TECHNICAL FIELD

The present invention relates to an embedded magnet rotor for a rotary electric machine such as an electric motor or a generator, for example, and particularly relates to a holding construction for magnets that are embedded in the rotor core.

BACKGROUND ART

Conventional embedded magnet rotors for rotary electric machines have included: a rotating shaft; a core portion that is disposed around the rotating shaft, and on which a plurality of penetrating apertures are disposed; a plurality of permanent magnets that are respectively housed in the plurality of penetrating apertures; a filler that fills a gap between the permanent magnet and the core portion inside each of the plurality of penetrating apertures; a pair of end plates that hold the core portion from two sides so as to block openings of the penetrating apertures; and adhesion suppressing portions that are disposed at boundary portions between the end plates and the core portion, and that suppress adhesion between the end plates and the core portion due to the filler (see Patent Literature 1, for example).

CITATION LIST

Patent Literature

Patent Literature 1: Japanese Patent No. 46556556 (Gazette)

SUMMARY OF THE INVENTION

Problem to be Solved by the Invention

In the above conventional embedded magnet rotor for a rotary electric machine, because the end plates bear a function of fixing and preventing scattering of the permanent magnets, it has been necessary to dispose the end plates so as to contact outer circumferential edge portions of the penetrating apertures of the core portion at two axial ends of the core portion. Thus, one problem has been that two end plates are required, increasing the number of parts and increasing costs. Another problem has been that if axial cupping occurs on an outer circumferential portion of the core portion, then the end plate that is disposed near a protruding portion of the cupping in the core portion may be separated from the outer circumferential edge portions of the penetrating apertures of the core portion, making fixing of the permanent magnets inadequate, which may lead to scattering of the permanent magnets. The shape of the end plates can also be changed so as to contact the outer circumferential edge portions of the penetrating apertures of the core portion so as to avoid the cupping of the core portion, but one problem has been that the shape of the end plates becomes complicated, leading to cost increases.

The present invention aims to solve the above problems and an object of the present invention is to provide an embedded magnet rotor for a rotary electric machine that can prevent scattering of permanent magnets inexpensively without using end plates that have complicated shapes, by imparting a gradient in an axial direction of a rotor core to a fill rate of adhesive that holds the permanent magnets such that a function of fixing and preventing scattering of the magnets is borne by the adhesive at an end where the fill rate of the adhesive is greater, and a function of fixing and preventing scattering of the magnets is borne by an end plate at an end where the fill rate of the adhesive is reduced, or a function of fixing and preventing scattering of the magnets is borne by butting together ends of core segments where the fill rate of the adhesive is reduced in a rotor core that is divided into two segments axially.

Means for Solving the Problem

In order to achieve the above object, according to one aspect of the present invention, there is provided an embedded magnet rotor for a rotary electric machine including: a rotor core that is produced by laminating and integrating thin magnetic sheets, on which a shaft insertion aperture is formed so as to pass through a central position, and on which a plurality of magnet housing apertures are respectively arranged at a uniform angular pitch circumferentially so as to pass through an outer circumferential side; a shaft that is inserted into the shaft insertion aperture, and that holds the rotor core; a plurality of permanent magnets that are respectively housed in the plurality of magnet housing apertures; an adhesive that is injected into and cured in a gap between the permanent magnet and the rotor core in each of the plurality of magnet housing apertures, and that fixes the permanent magnet to the rotor core; and a first end plate that is held by the shaft so as to contact a first axial end of the rotor core, and that blocks first axial end openings of the plurality of magnet housing apertures. A fill rate of the adhesive that is injected into the gap is increased gradually from a first axial end toward a second axial end of the magnet housing aperture.

Effects of the Invention

According to the present invention, because the fill rate of the adhesive that is injected into the gaps that are formed between the rotor core and the permanent magnets is increased gradually from a first axial end toward a second axial end of the magnet housing apertures, the holding force on the permanent magnets by the adhesive increases gradually from the first axial end toward the second axial end of the magnet housing apertures. Thus, the permanent magnets that are housed near the second axial end inside the magnet housing apertures are held on the rotor core firmly by the adhesive, suppressing occurrences of situations such as scattering.

Furthermore, the first end plate contacts the first axial end of the rotor core, and blocks the first axial end openings of the magnet housing apertures. Thus, the permanent magnets that are housed near the first axial end inside the magnet housing apertures, where the holding strength of the adhesive is weaker, are held by the first end plate, suppressing occurrences of situations such as scattering.

In addition, even if axial cupping occurs in the rotor core, by increasing the fill rate of the adhesive near the protruding portion of the cupping of the rotor core, the function of fixing and preventing scattering of the magnets is borne by the adhesive, enabling fixing and prevention of scattering of the magnets without using end plates that have complicated shapes, thereby enabling cost increases to be suppressed.

DESCRIPTION OF EMBODIMENTS

Preferred embodiments of the embedded magnet rotor for a rotary electric machine according to the present invention will now be explained with reference to the drawings.

Embodiment 1

Figure 1:
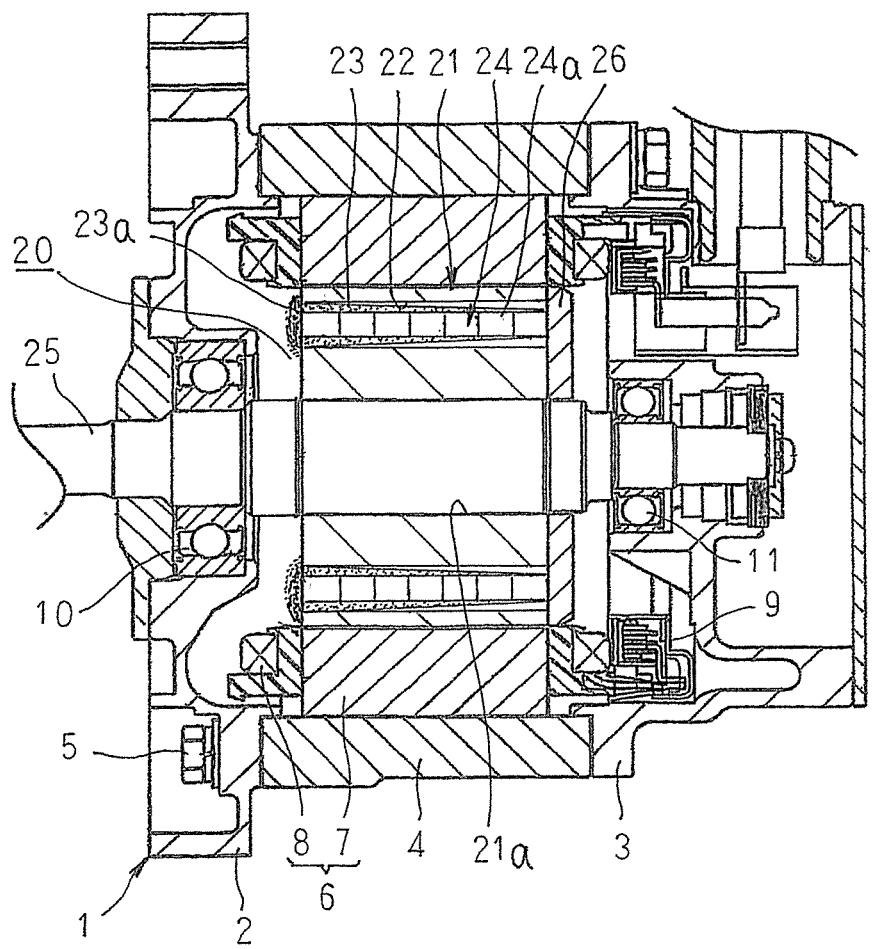
FIG. 1 is a longitudinal cross section that shows a rotary electric machine according to Embodiment 1 of the present invention.
Figure 2:
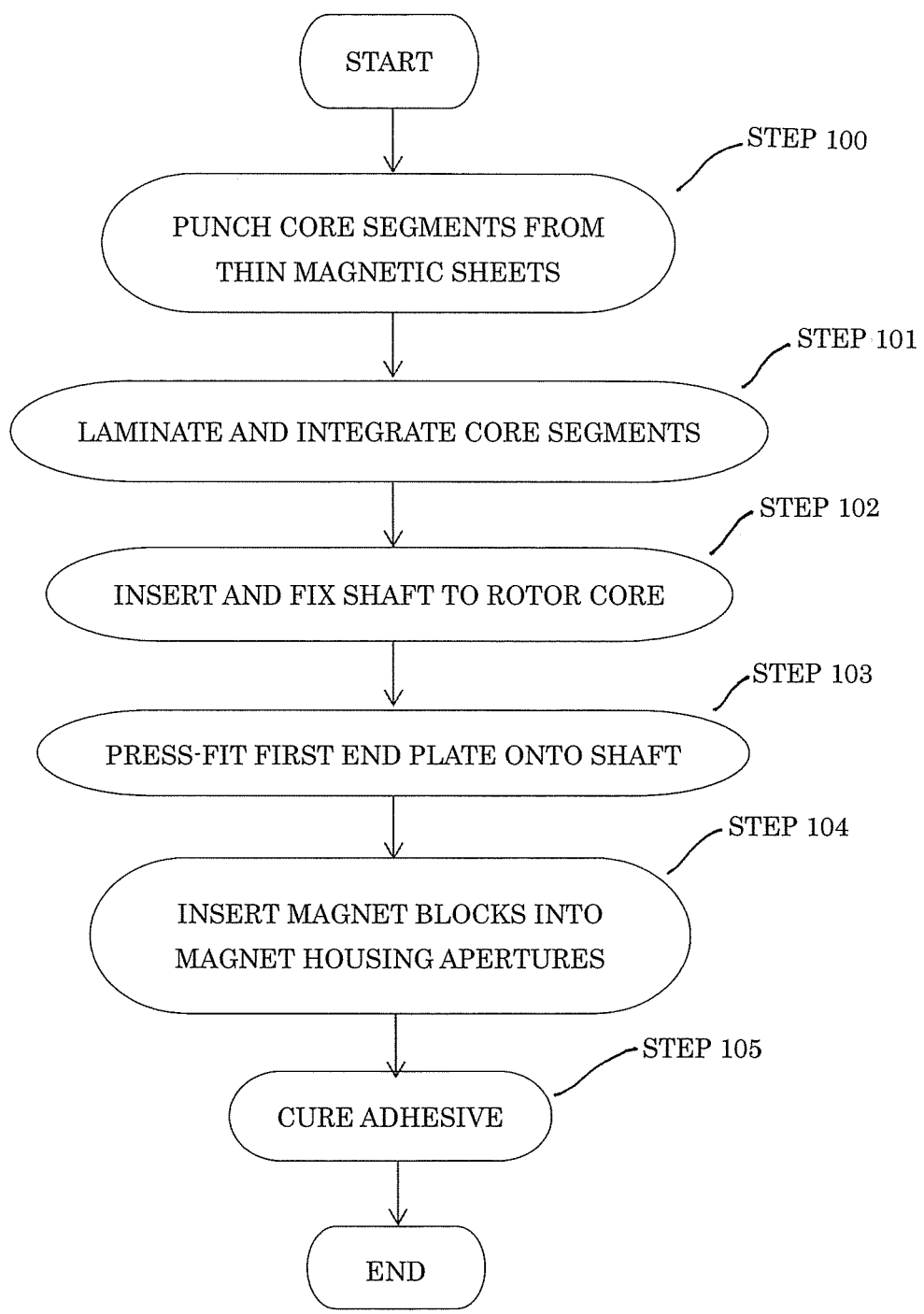
FIG. 2 is a diagram that explains a method for assembling an embedded magnet rotor for the rotary electric machine according to Embodiment 1 of the present invention.

FIG. 1 is a longitudinal cross section that shows a rotary electric machine according to Embodiment 1 of the present invention, and FIG. 2 is a diagram that explains a method for assembling an embedded magnet rotor for the rotary electric machine according to Embodiment 1 of the present invention. Moreover, a "longitudinal cross section" is a cross section that includes a central axis of a rotating shaft.

In FIG. 1, a rotary electric machine 100 includes: a housing 1; a stator 6 that is held by the housing 1; a connecting unit 9 that is disposed at a first axial end of the stator 6; and a rotor 20 that is held rotatably inside the housing 1, and that is disposed coaxially inside the stator.

The housing 1 includes: first and second brackets 2 and 3; and a metal cylindrical frame 4 that is held between the first and second brackets 2 and 3 from two axial ends, and that is held on the first and second brackets 2 and 3 by a fastening force from a bolt 5 that fastens the first and second brackets 2 and 3.

The stator 6 includes: an annular stator core 7; and a stator coil 8 that is mounted onto the stator core 7. The stator 6 is held by the frame 4 so as to be fixed by the stator core 7 being inserted into the frame 4 by shrinkage fitting, etc. In addition, the connecting unit 9, which AC-connects the stator coil 8, is disposed on an axial end of the stator 6.

The rotor 20 includes: a rotor core 21 in which a plurality of magnet housing apertures 22 that are each formed at a uniform angular pitch circumferentially so as to pass through axially; a plurality of permanent magnets 24 that are respectively housed in the plurality of magnet housing apertures 22, and that are fixed to the rotor core 21 by an adhesive 23 that is injected into and cured inside the magnet housing apertures 22; a shaft 25 that is inserted through and fixed to a central position of the rotor core 21; and a first end plate 26 that is fixed to a first axial end surface of the rotor core 21. The rotor 20 is rotatably disposed inside the housing 1 such that the shaft 25 is rotatably supported by first and second bearings 10 and 11 that are disposed on the first and second brackets 2 and 3.

The rotor core 21 is produced by laminating and integrating a number of core segments that are produced by punching thin magnetic sheets such as electromagnetic steel sheets, for example. The permanent magnets 24 are configured such that a plurality of rectangular parallelepiped magnet blocks 24a are housed in the magnet housing apertures 22 so as to line up in single columns, and are fixed by the adhesive 23. The first end plate 26 is produced using a nonmagnetic material such as a stainless alloy, for example, into a ring-shaped flat plate that has a shaft insertion aperture at a central position.

Next, a method for assembling the rotor 20 will be explained with reference to FIG. 2.

First, flat ring-shaped core segments are punched from thin magnetic sheets such as electromagnetic steel sheets (Step 100). A penetrating aperture is formed centrally on the core segments, and magnet housing apertures are formed at a uniform angular pitch on an outer circumferential side. Next, a plurality of the core segments are laminated, and are integrated by crimping, etc., to produce the rotor core 21 (Step 101). In a rotor core 21 that is produced in this manner, the penetrating apertures of the core segments line up axially to constitute the shaft insertion aperture 21a, and the magnet housing apertures of the core segments line up axially to constitute the magnet housing apertures 22. The magnet housing apertures 22 are formed on the rotor core 21 so as to be parallel to the shaft insertion aperture 21a so as to have a constant aperture shape that has a rectangular cross section that is larger than a rectangular cross section of the magnet blocks 24a.

Next, the rotor core 21 and the shaft 25 are integrated by press-fitting the shaft 25 into the shaft insertion aperture 21a of the rotor core 21 (Step 102). Next, the first end plate 26 is press-fitted onto the shaft 25 from a first axial end until it contacts the first axial end surface of the rotor core 21 (Step 103). Thus, first axial end openings of the magnet housing apertures 22 that are disposed through the rotor core 21 are blocked by the first end plate 26.

Next, the magnet blocks 24a, to which the adhesive 23 has been applied, are inserted through second axial end openings of the magnet housing apertures 22 one at a time (Step 104). In this case, seven magnet blocks 24a are inserted into the magnet housing apertures 22. The magnet block 24a that is inserted into the magnet housing apertures 22 first is pressed by the magnet blocks 24a that are subsequently inserted into the magnet housing apertures 22 and moves toward the first axial end, eventually coming into contact with the first end plate 26 to complete insertion of the magnet blocks 24a into the magnet housing apertures 22. Here, adhesive accumulating portions 23a are formed by the adhesive 23 that is applied to the magnet blocks 24a being scraped off by edge portions of the second end openings during insertion into the magnet housing apertures 22 such that the adhesive 23 accumulates on the edge portions of the second axial end openings of the magnet housing apertures 22. The adhesive 23 that has adhered to the magnet blocks 24a is stripped off onto inner wall surfaces of the magnet housing apertures 22 as they move through the magnet housing apertures 22 toward the first axial end. Thus, the amount of adhesive 23 that adheres to the magnet blocks 24a is reduced toward the first axial end.

When the step of mounting the magnet blocks 24a into the magnet housing apertures 22 is completed, the adhesive 23 is cured at room temperature, or is cured by being accommodated inside a thermostatic chamber that is raised to a curing temperature (Step 105), completing assembly of the rotor 20.

In a rotor 20 that is assembled in this manner, the fill rate of the adhesive 23 that is inserted into the gaps between the magnet housing apertures 22 and the magnet blocks 24a is inclined so as to be reduced gradually from the second axial end toward the first end. Thus, the holding force on the magnet blocks 24a by the cured adhesive 23 increases gradually from the first axial end toward the second end. The adhesive 23 near the second axial end can thereby achieve a holding force on the permanent magnets 24 that is sufficient to bear the function of fixing and preventing scattering of the permanent magnets 24.

In addition, the cured adhesive accumulating portions 23a cover the magnet blocks 24a, and block the second axial end openings of the magnet housing apertures 22. Thus, the holding force on the magnet blocks 24a by the cured adhesive 23 near the second axial end increases further.

At the first axial end, on the other hand, the fill rate of the adhesive 23 is reduced, making the holding force on the permanent magnets 24 by the adhesive 23 smaller. However, the first end plate 26 is press-fitted onto the shaft 25, contacts the first axial end surface of the rotor core 21, and blocks the first axial end openings of the magnet housing apertures 22. Thus, the first end plate 26 bears the function of fixing and preventing scattering of the permanent magnets 24.

Thus, according to Embodiment 1, a gradient is imparted to the holding force of the permanent magnets 24 by the adhesive 23, increasing the holding force on the permanent magnets 24 by the adhesive 23 at the second axial end. The first end plate 26 is press-fitted onto the shaft 25, contacts the first axial end surface of the rotor core 21, and blocks the first axial end openings of the magnet housing apertures 22. Thus, the adhesive 23 is made to bear the function of fixing and preventing scattering of the permanent magnets 24 at the second axial end, and the first end plate 26 is made to bear the function of fixing and preventing scattering of the permanent magnets 24 at the first axial end, enabling scattering of the permanent magnets 24 to be prevented inexpensively without using end plates that have special shapes.

The adhesive accumulating portions 23a cover the magnet blocks 24a, and block the second axial end openings of the magnet housing apertures 22. Thus, the holding force of the magnet blocks 24a by the cured adhesive 23 near the second axial end increases further, enabling dislodging of the permanent magnets 24 to be reliably stopped.

In addition, an end plate that bears a function of fixing and preventing scattering of the permanent magnets 24 at the second axial end is no longer required, enabling the number of parts to be reduced, and assemblability of the rotor 20 is also improved, enabling reductions in the cost of the rotor 20 to be achieved.

Moreover, in Embodiment 1 above, the first end plate 26 is press-fitted onto the shaft 25 from a first axial end so as to contact the first axial end surface of the rotor core 21, and then the magnet blocks 24a are inserted into the magnet housing apertures 22, but the magnet blocks 24a may be inserted into the magnet housing apertures 22, and then the first end plate 26 press-fitted onto the shaft 25 from the first axial end so as to contact the first axial end surface of the rotor core 21.

Embodiment 2

Figure 3:
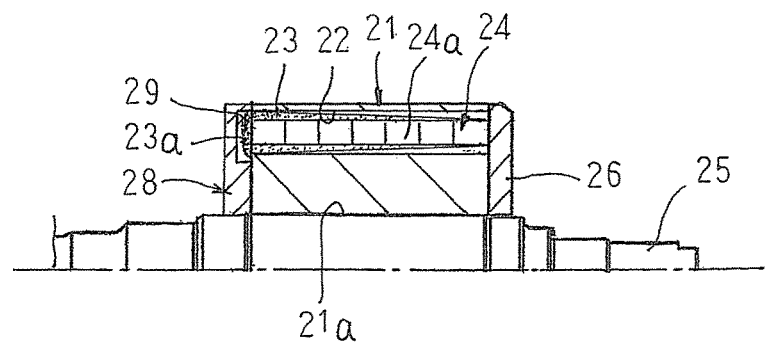
FIG. 3 is a half section that shows an embedded magnet rotor for a rotary electric machine according to Embodiment 2 of the present invention.

FIG. 3 is a half section that shows an embedded magnet rotor for a rotary electric machine according to Embodiment 2 of the present invention.

In FIG. 3, a rotor 20A includes: a second end plate 28 that is pressed onto and fixed to a shaft 25, and that is disposed at a second axial end of a rotor core 21. The second end plate 28 is produced using a nonmagnetic material such as a stainless alloy, for example, into ring-shaped flat plate that has a shaft insertion aperture at a central position. An adhesive accumulating portion housing recess portion 29 is recessed into a first surface of the second end plate 28 so as to face adhesive accumulating portions 23a.

Moreover, the rotor 20A according to Embodiment 2 is configured in a similar or identical manner to that of the rotor 20 according to Embodiment 1 above except that the second end plate 28 is included.

A rotor 20A is assembled in a similar manner to Embodiment 1 above, by attaching the shaft 25 to the rotor core 21, press-fitting the first end plate 26 onto the shaft 25 from the first axial end, inserting the magnet blocks 24a into the magnet housing apertures 22, curing the adhesive 23, and then press-fitting the second end plate 28 from the second axial end onto the shaft 25 such that the first surface of the second end plate 28 faces toward the rotor core 21.

In a rotor 20A that is assembled in this manner, the second end plate 28 contacts the second axial end surface of the rotor core 21, and the adhesive accumulating portions 23a are housed inside the adhesive accumulating portion housing recess portion 29, as shown in FIG. 3.

In Embodiment 2, the first end plate 26 is press-fitted onto the shaft 25 so as to contact the first axial end surface of the rotor core 21, and blocks the first axial end openings of the magnet housing apertures 22. A gradient is imparted to the holding force of the permanent magnets 24 by the adhesive 23, increasing the holding force of the permanent magnets 24 by the adhesive 23 at the second axial end. Thus, because the adhesive 23 is made to bear the function of fixing and preventing scattering of the permanent magnets 24 at the second axial end, and the first end plate 26 is made to bear the function of fixing and preventing scattering of the permanent magnets 24 at the first axial end, similar effects to those in Embodiment 1 above can also be achieved in Embodiment 2.

According to Embodiment 2, because the second end plate 28 is press-fitted onto the shaft 25 so as to contact the second axial end surface of the rotor core 21, and covers the adhesive accumulating portions 23a, scattering of the permanent magnets 24 at the second axial end can be prevented more reliably.

Embodiment 3

Figure 4:
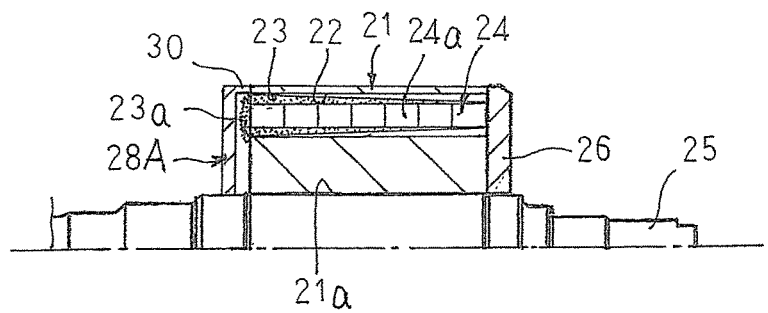
FIG. 4 is a half section that shows an embedded magnet rotor for a rotary electric machine according to Embodiment 3 of the present invention.

FIG. 4 is a half section that shows an embedded magnet rotor for a rotary electric machine according to Embodiment 3 of the present invention.

In FIG. 4, a rotor 20B includes: a second end plate 28A that is held on a shaft 25, and that is disposed at a second axial end of a rotor core 21. The second end plate 28 is produced using a nonmagnetic material such as a stainless alloy, for example, into a ring-shaped flat plate, a shaft insertion aperture is formed at a central position, and a flange portion 30 protrudes outward on a first surface side from an outer circumferential portion, and is formed so as to have an annular shape.

Moreover, the rotor 20B according to Embodiment 3 is configured in a similar or identical manner to that of the rotor 20 according to Embodiment 1 above except that the second end plate 28A is included.

A rotor 20B is assembled in a similar manner to Embodiment 1 above, by attaching the shaft 25 to the rotor core 21, press-fitting the first end plate 26 onto the shaft 25 from the first axial end, inserting the magnet blocks 24a into the magnet housing apertures 22, curing the adhesive 23, and then press-fitting the second end plate 28A from the second axial end onto the shaft 25 such that the first surface of the second end plate 28A faces toward the rotor core 21.

In a rotor 20B that is assembled in this manner, the flange portion 30 of the second end plate 28A contacts the second axial end surface of the rotor core 21, and the adhesive accumulating portion 23a is housed inside a space on an inner circumferential side of the flange portion 30.

In Embodiment 3, the first end plate 26 is press-fitted onto the shaft 25 so as to contact the first axial end surface of the rotor core 21, and blocks the first axial end openings of the magnet housing apertures 22. A gradient is imparted to the holding force of the permanent magnets 24 by the adhesive 23, increasing the holding force of the permanent magnets 24 by the adhesive 23 at the second axial end. Thus, because the adhesive 23 is made to bear the function of fixing and preventing scattering of the permanent magnets 24 at the second axial end, and the first end plate 26 is made to bear the function of fixing and preventing scattering of the permanent magnets 24 at the first axial end, similar effects to those in Embodiment 1 above can also be achieved in Embodiment 3.

According to Embodiment 3, because the second end plate 28A is press-fitted onto the shaft 25 so as to contact the second axial end surface of the rotor core 21, and covers the adhesive accumulating portion 23a, scattering of the permanent magnets 24 at the second axial end can be prevented more reliably.

Embodiment 4

Figure 5:
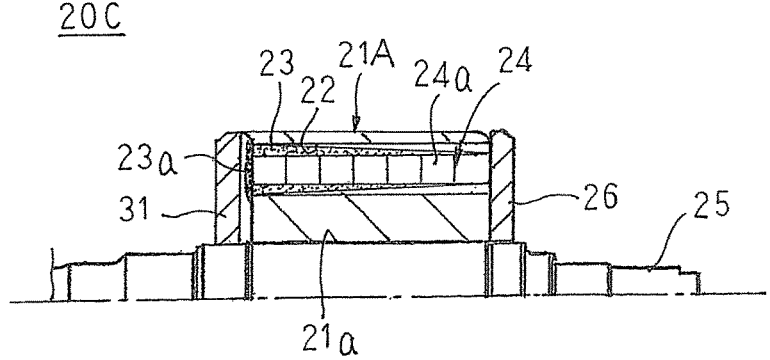
FIG. 5 is a half section that shows an embedded magnet rotor for a rotary electric machine according to Embodiment 4 of the present invention.

FIG. 5 is a half section that shows an embedded magnet rotor for a rotary electric machine according to Embodiment 4 of the present invention.

In FIG. 5, a rotor core 21A of a rotor 20C is fixed to a shaft 25 by shrinkage fitting, and an outer circumferential portion is cupped toward a second axial end. First and second end plates 26 and 31 are press-fitted onto the shaft 25 so as to be positioned on opposite sides of the rotor core 21A.

Moreover, the rotor 20C according to Embodiment 4 is configured in a similar or identical manner to that of the rotor 20 according to Embodiment 1 above except that the rotor core 21A is fixed to the shaft 25 by shrinkage fitting, and that the second end plate 31 is included.

Next, a method for assembling the rotor 20C will be explained.

First, core segments are punched from thin magnetic sheets such as electromagnetic steel sheets, for example. Next, a plurality of the core segments are laminated so as to align punching directions, and are integrated by crimping, etc., to produce the rotor core 21A. Next, the diameter of the shaft insertion aperture 21a is increased by heating the rotor core 21A, and the shaft 25 is inserted into the shaft insertion aperture 21a. Here, the punching directions of the core segments are in a direction from the second axial end of the shaft 25 toward the first end. The rotor core 21A is subsequently cooled to integrate the rotor core 21A and the shaft 25. In other words, the rotor core 21A is integrated with the shaft 25 by shrinkage fitting. The rotor core 21A is configured in a similar or identical manner to that of the rotor core 21 except that stresses arise on an inner circumferential portion during shrinkage fitting, cupping the outer circumferential portion toward the second axial end.

Now, when the core segments are punched from the thin magnetic sheets, rounding occurs on a first side of the end surfaces of the core segments, and burring occurs on a second end of the end surfaces of the core segments. A direction from the side on which rounding occurs toward the side on which burring occurs is the punching direction.

Next, the first end plate 26 is press-fitted onto the shaft 25 from a vicinity of a first axial end until it contacts the first axial end surface of the rotor core 21A. Next, the magnet blocks 24a, to which the adhesive 23 has been applied, are inserted through second axial end openings of the magnet housing apertures 22 one at a time. When the step of mounting the magnet blocks 24a into the magnet housing apertures 22 is completed, the adhesive 23 is cured at room temperature, or is cured by being accommodated inside a thermostatic chamber that is raised to a curing temperature. Next, the second end plate 31 is press-fitted onto the shaft 25 from a first axial end until it contacts the first axial end surface of the rotor core 21A, as shown in FIG. 5, completing assembly of the rotor 20C. An outer circumferential edge of a first surface of the second end plate 31 contacts a protruding portion on an outer circumferential portion of the rotor core 21A that protrudes toward the second axial end, and the second end plate 31 is separated from the adhesive accumulating portions 23a that block the second axial end openings of the magnet housing apertures 22.

In Embodiment 4, the first end plate 26 is press-fitted onto the shaft 25 so as to contact the first axial end surface of the rotor core 21A, and blocks the first axial end openings of the magnet housing apertures 22. A gradient is imparted to the holding force of the permanent magnets 24 by the adhesive 23, increasing the holding force of the permanent magnets 24 by the adhesive 23 at the second axial end. Thus, because the adhesive 23 is made to bear the function of fixing and preventing scattering of the permanent magnets 24 at the second axial end, and the first end plate 26 is made to bear the function of fixing and preventing scattering of the permanent magnets 24 at the first axial end, similar effects to those in Embodiment 1 above can also be achieved in Embodiment 4.

According to Embodiment 4, the outer circumferential portion of the rotor core 21A is cupped toward the second axial end due to shrinkage fitting, but because the function of fixing and preventing scattering of the permanent magnets 24 at the second axial end is borne by the adhesive 23, it is not necessary to form the second end plate 31 into a special shape that avoids cupping in the rotor core 21A, and contacts the edge portions of the second axial end openings of the magnet housing apertures 22 of the rotor core 21A. In other words, the outer circumferential portion of the second end plate 31 need contact only the protruding portion of the rotor core 21A at the second axial end, enabling the shape to be similar or identical to that of the first end plate 26, thereby enabling the number of parts to be reduced.

Because the second end plate 31 is press-fitted onto the shaft 25 so as to contact the second axial end surface of the rotor core 21, and covers the adhesive accumulating portions 23a, scattering of the permanent magnets 24 at the second axial end can be prevented more reliably.

Embodiment 5

Figure 6:
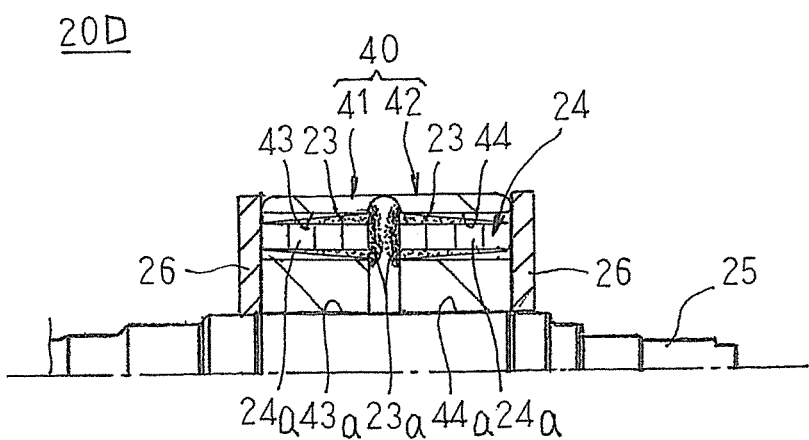
FIG. 6 is a half section that shows an embedded magnet rotor for a rotary electric machine according to Embodiment 5 of the present invention.

FIG. 6 is a half section that shows an embedded magnet rotor for a rotary electric machine according to Embodiment 5 of the present invention.

In FIG. 6, a rotor core 40 is constituted by a first rotor core 41 and a second rotor core 42. The first and second rotor cores 41 and 42 are fixed to a shaft 25 by shrinkage fitting, and are disposed on the shaft 25 such that axial cups face each other. In addition, first end plates 26 are press-fitted onto the shaft 25 so as to be positioned on opposite sides of the rotor core 41.

Moreover, the rotor 20D according to Embodiment 5 is configured in a similar or identical manner to that of the rotor 20 according to Embodiment 1 above except that the rotor core 40 is fixed to the shaft 25, and that the first end plates 26 are included so as to be positioned on opposite sides of the rotor core 40.

The first and second rotor cores 41 and 42 are produced by laminating a plurality of core segments that are punched out of thin magnetic sheets such as electromagnetic steel sheets so as to align punching directions, and are integrated by crimping, etc. Shaft insertion apertures 41a and 42a are formed on the first and second rotor cores 41 and 42 so as to pass through central positions. In addition, magnet housing apertures 43 and 44 are arranged around outer circumferential sides of the first and second rotor cores 41 and 42 at a uniform angular pitch circumferentially so as to pass through axially. The magnet housing apertures 43 and 44 are formed on the first and second rotor cores 41 and 42 so as to be parallel to the shaft insertion apertures 41a and 42a so as to have a constant aperture shape that has a rectangular cross section that is larger than a rectangular cross section of the magnet blocks 24a.

The first and second rotor cores 41 and 42 are fixed to the shaft 25 by shrinkage fitting so as to line up in an axial direction in contact with each other. Here, the punching directions of the core segments in the first rotor core 41 are in a direction from the first axial end of the shaft 25 toward the second end, and the punching directions of the core segments in the second rotor core 42 are in a direction from the second axial end of the shaft 25 toward the first end. Thus, stresses arise on an inner circumferential portion of the first rotor core 41 during shrinkage fitting, cupping an outer circumferential portion toward the first axial end, and stresses arise on an inner circumferential portion of the second rotor core 42 during shrinkage fitting, cupping an outer circumferential portion toward the second axial end. A protruding portion on the outer circumferential portion of the first rotor core 41 that protrudes toward the first axial end contacts a protruding portion on the outer circumferential portion of the second rotor core 42 that protrudes toward the first second axial end.

Permanent magnets 24 that are housed in the magnet housing apertures 43 and 44 of the first and second rotor cores 41 and 42 are held by an adhesive 23. In addition, adhesive accumulating portions 23a face each other so as to leave a gap, cover the magnet blocks 24a, and block the openings of the magnet housing apertures 43 and 44. In addition, first end plates 26 are press-fitted onto the shaft 25 from two axial ends, and contact the second axial end surface of the first rotor core 41 and the first axial end surface of the second rotor core 42.

In Embodiment 5, the first and second rotor cores 41 and 42 are mounted onto the shaft 25 so as to line up in an axial direction such that sides that are cupped outward face each other and protruding portions on outer circumferential portions that protrude in an axial direction are butted together. The fill rate of the adhesive 23 is inclined so as to gradually increase toward center from the two axial ends of the rotor core 40. Thus, the holding force on the permanent magnets 24 by the adhesive 23 is reduced at the two axial end portions, but the pair of first end plates 26 that are press-fitted onto the shaft 25 so as to be positioned on opposite sides of the rotor core 40 bear the function of fixing and preventing scattering of the permanent magnets 24 at the two axial ends, enabling scattering of the permanent magnets 24 to be prevented.

A gap is formed between the first and second rotor cores 41 and 42, but the holding force on the permanent magnets 24 by the adhesive 23 centrally in the axial direction of the rotor core 40 is greater. The permanent magnets 24 will not dislodge into the gap between the first and second rotor cores 41 and 42.

Because adhesive accumulating portions 23a face each other so as to have a gap interposed, cover the magnet blocks 24a, and block the openings of the magnet housing apertures 43 and 44, the holding force on the permanent magnets 24 by the adhesive 23 centrally in the axial direction of the rotor core 40 is even greater. Thus, the permanent magnets 24 will not dislodge into the gap between the first and second rotor cores 41 and 42.

Because the first and second rotor cores 41 and 42 are mounted onto the shaft 25 such that cups of the outer circumferential portions due to shrinkage fitting face each other, it is not necessary to form the first end plates 26 into special shapes that avoid the cupping on the first and second rotor cores 41 and 42 and that contact the edge portions of the openings of the magnet housing apertures 43 and 44 of the first and second rotor cores 41 and 42.

Embodiment 6

Figure 7:
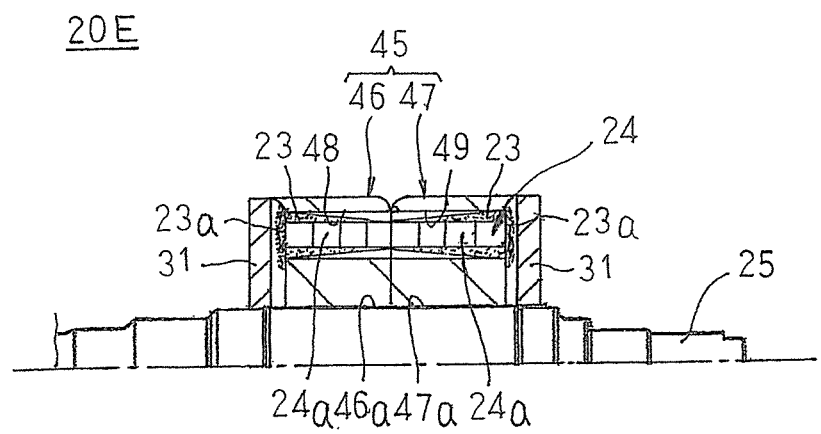
FIG. 7 is a half section that shows an embedded magnet rotor for a rotary electric machine according to Embodiment 6 of the present invention.

FIG. 7 is a half section that shows an embedded magnet rotor for a rotary electric machine according to Embodiment 6 of the present invention.

In FIG. 7, a rotor core 45 is constituted by a first rotor core 46 and a second rotor core 47. The first and second rotor cores 46 and 47 are fixed to a shaft 25 by shrinkage fitting, and are disposed on the shaft 25 such that axial cups face axially outward. In addition, second end plates 31 are press-fitted onto the shaft 25 so as to be positioned on opposite sides of the rotor core 45.

Moreover, the rotor 20E according to Embodiment 6 is configured in a similar or identical manner to that of the rotor 20 according to Embodiment 1 above except that the rotor core 45 is fixed to the shaft 25, and that the second end plates 31 are included.

Next, a method for assembling the rotor 20E will be explained.

First, core segments are punched from thin magnetic sheets such as electromagnetic steel sheets, for example. Next, a plurality of the core segments are laminated so as to align punching directions, and are integrated by crimping, etc., to produce the first and second rotor cores 46 and 47. Shaft insertion apertures 46a and 47a are formed on the first and second rotor cores 46 and 47 so as to pass through central positions. In addition, magnet housing apertures 48 and 49 are arranged around outer circumferential sides of the first and second rotor cores 46 and 47 at a uniform angular pitch circumferentially so as to pass through axially. The magnet housing apertures 48 and 49 are formed on the first and second rotor cores 46 and 47 so as to be parallel to the shaft insertion apertures 46a and 47a so as to have a constant aperture shape that has a rectangular cross section that is larger than a rectangular cross section of the magnet blocks 24a.

Next, the diameters of the shaft insertion apertures 46a and 47a are increased by heating the first and second rotor cores 46 and 47, and the shaft 25 is inserted into the shaft insertion apertures 46a and 47a. Here, the punching directions of the core segments in the first rotor core 46 are in a direction from the second axial end of the shaft 25 toward the first end, and the punching directions of the core segments in the second rotor core 47 are in a direction from the first axial end of the shaft 25 toward the second end.

The first and second rotor cores 46 and 47 are subsequently cooled to integrate the first and second rotor cores 46 and 47 and the shaft 25. In other words, the first and second rotor cores 46 and 47 are integrated with the shaft 25 by shrinkage fitting. Stresses arise on an inner circumferential portion of the first rotor core 46 during shrinkage fitting, cupping an outer circumferential portion toward the second axial end, and stresses arise on an inner circumferential portion of the second rotor core 47 during shrinkage fitting, cupping an outer circumferential portion toward the first axial end. A first axial end surface of the first rotor core 46 contacts a second axial end surface of the second rotor core 47.

Next, four magnet blocks 24a, to which the adhesive 23 has been applied, are inserted through second axial end openings of the magnet housing apertures 48 one at a time. Next, four magnet blocks 24a, to which the adhesive 23 has been applied, are inserted through first axial end openings of the magnet housing apertures 49 one at a time. When the mounting of these magnet blocks 24a into the magnet housing apertures 48 and 49 is completed, the adhesive 23 is cured at room temperature, or is cured by being accommodated inside a thermostatic chamber that is raised to a curing temperature. The cured adhesive accumulating portions 23a cover the magnet blocks 24a, and block the openings of the magnet housing apertures 48 and 49.

Next, the second end plates 31 are press-fitted onto the shaft 25 from the first axial end and the second axial end until they contact the two axial end surfaces of the rotor core 45, as shown in FIG. 7, completing assembly of the rotor 20E. Outer circumferential edges of first surfaces of the second end plates 31 contact protruding portions on outer circumferential portions of the first and second rotor cores 46 and 47 that protrude axially outward, and the second end plates 31 are separated from the adhesive accumulating portions 23a that block the openings of the magnet housing apertures 48 and 49.

In Embodiment 6, the first and second rotor cores 46 and 47 are mounted onto the shaft 25 so as to line up in an axial direction such that sides that cup outward face axially outward and end surfaces at opposite ends from the sides that are cupped outward are butted together. The fill rate of the adhesive 23 is inclined so as to gradually increase toward the two ends from the center of the rotor core 45 in the axial direction. Thus, the holding force on the permanent magnets 24 by the adhesive 23 is greater at the two axial end portions. Thus, the adhesive 23 at the two axial ends bears the function of fixing and preventing scattering of the permanent magnets 24, enabling scattering of the permanent magnets 24 to be prevented.

Because the permanent magnets 24, which are housed in the magnet housing apertures 48 and 49 of the first and second rotor cores 46 and 47, are butted together at a central portion in the axial direction of the rotor core 45, where the holding force of the adhesive 23 is weaker, situations such as the permanent magnets 24 dislodging and scattering are prevented.

The outer circumferential portions of the rotor core 45 are cupped toward the two axial ends due to shrinkage fitting, but because the function of fixing and preventing scattering of the permanent magnets 24 at the two axial ends is borne by the adhesive 23, it is not necessary to form the second end plates 31 into a special shape that avoids cups in the rotor core 45, and contacts the edge portions of the openings of the magnet housing apertures 48 and 49 of the rotor core 45.

Because the second end plates 31 are press-fitted onto the shaft 25 so as to contact the two axial end surfaces of the rotor core 45, and covers the adhesive accumulating portions 23a, scattering of the permanent magnets 24 at the two axial ends can be prevented more reliably.

Moreover, in each of the above embodiments, the magnet housing apertures are formed so as to have an aperture shape that has a rectangular cross section, but the aperture shape of the magnet housing apertures is not limited to a rectangular cross section, provided that it is an aperture shape that can house the magnet blocks.

In each of the above embodiments, the cross-sectional shape of the magnet housing apertures in the axial direction is formed so as to be constant, but provided that the fill rate of the adhesive that fills gaps between the magnet housing apertures and the permanent magnets is imparted with a gradient in the axial direction, it is not necessary to make the cross-sectional shape of the magnet housing apertures constant in the axial direction.

In each of the above embodiments, the permanent magnets are configured using a plurality of magnet blocks, but the permanent magnets may be constituted by single parts.

The invention claimed is:

1. An embedded magnet rotor for a rotary electric machine comprising:
    a rotor core that is produced by laminating and integrating thin magnetic sheets, on which a shaft insertion aperture is formed so as to pass through a central position, and on which a plurality of magnet housing apertures are respectively arranged at a uniform angular pitch circumferentially so as to pass through an outer circumferential side;
    a shaft that is inserted into said shaft insertion aperture, and that holds said rotor core;
    a plurality of permanent magnets that are respectively housed in said plurality of magnet housing apertures;
    an adhesive that is injected into and cured in a gap between said permanent magnet and said rotor core in each of said plurality of magnet housing apertures, and that fixes said permanent magnet to said rotor core; and
    a pair of end plates that are held by said shaft so as to contact two axial ends of said rotor core, and that block axial openings of said plurality of magnet housing apertures,
    wherein:
    said rotor core is configured by arranging in an axial direction a first rotor core that has axial cupping in which an outer circumferential portion displaces toward a first axial end, and a second rotor core that has axial cupping in which an outer circumferential portion displaces toward a second axial end, so as to contact each other such that axially protruding portions of said outer circumferential portions face each other;

a fill amount of said adhesive that is injected into said gap in said first rotor core is increased gradually from a second axial end toward a first axial end of said first rotor core; and a fill amount of said adhesive that is injected into said gap in said second rotor core is increased gradually from a first axial end toward a second axial end of said second rotor core.

2. An embedded magnet rotor for a rotary electric machine comprising:

a rotor core that is produced by laminating and integrating thin magnetic sheets, on which a shaft insertion aperture is formed so as to pass through a central position, and on which a plurality of magnet housing apertures are respectively arranged at a uniform angular pitch circumferentially so as to pass through an outer circumferential side;

a shaft that is inserted into said shaft insertion aperture, and that holds said rotor core;

a plurality of permanent magnets that are respectively housed in said plurality of magnet housing apertures; and an adhesive that is injected into and cured in a gap between said permanent magnet and said rotor core in each of said plurality of magnet housing apertures, and that fixes said permanent magnet to said rotor core, wherein:

said rotor core is configured by arranging in an axial direction a first rotor core that has axial cupping in which an outer circumferential portion displaces toward a first axial end, and a second rotor core that has axial cupping in which an outer circumferential portion displaces toward a second axial end, so as to contact each other such that axially protruding portions of said outer circumferential portions face in opposite directions;

a fill amount of said adhesive that is injected into said gap in said first rotor core is increased gradually from a second axial end toward a first axial end of said first rotor core; and a fill amount of said adhesive that is injected into said gap in said second rotor core is increased gradually from a first axial end toward a second axial end of said second rotor core.

3. The embedded magnet rotor for a rotary electric machine according to claim 2, further comprising a pair of end plates that are held by said shaft so as to be disposed at two axial ends of said rotor core, and contact said axially protruding portion of said outer circumferential portion of said first rotor core and said axially protruding portion of said outer circumferential portion of said second rotor core.

* * * * *